United States Patent
Wang et al.

(10) Patent No.: US 9,262,287 B2
(45) Date of Patent: Feb. 16, 2016

(54) COMPUTER INFORMATION SYSTEM AND DYNAMIC DISASTER RECOVERY METHOD THEREFOR

(71) Applicant: Tencent Technology (Shenzhen) Company Limited, Shenzhen (CN)

(72) Inventors: Xuxin Wang, Shenzhen (CN); Peng Xue, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 110 days.

(21) Appl. No.: 14/040,295

(22) Filed: Sep. 27, 2013

(65) Prior Publication Data
US 2014/0047264 A1    Feb. 13, 2014

Related U.S. Application Data

(63) Continuation of application No. PCT/CN2013/080413, filed on Jul. 30, 2013.

(30) Foreign Application Priority Data

Aug. 7, 2012    (CN) .......................... 2012 1 0277988

(51) Int. Cl.
*G06F 11/00* (2006.01)
*G06F 11/20* (2006.01)
*G06F 11/14* (2006.01)
*G06F 11/34* (2006.01)

(52) U.S. Cl.
CPC ............ *G06F 11/202* (2013.01); *G06F 11/143* (2013.01); *G06F 11/2023* (2013.01); *G06F 11/2035* (2013.01); *G06F 11/2002* (2013.01); *G06F 11/2038* (2013.01); *G06F 11/3433* (2013.01); *G06F 11/3466* (2013.01); *G06F 2201/81* (2013.01); *G06F 2201/88* (2013.01)

(58) Field of Classification Search
CPC .................. G06F 11/20; G06F 11/202; G06F 11/2023–11/2048
See application file for complete search history.

(56) References Cited

U.S. PATENT DOCUMENTS

| 7,356,531 | B1  | 4/2008 | Popelka et al. |
| 8,972,551 | B1* | 3/2015 | Yanacek et al. ............... 709/223 |
| 2011/0219263 | A1 | 9/2011 | Goel |

(Continued)

FOREIGN PATENT DOCUMENTS

| CN | 101222362 A | 7/2008 |
| CN | 101227315 A | 7/2008 |
| CN | 102546807 A | 7/2012 |

OTHER PUBLICATIONS

Tencent Technology, ISRWO, PCT/CN2013/080413, Nov. 7, 2013, 9 pgs.

*Primary Examiner* — Michael Maskulinski (74) *Attorney, Agent, or Firm* — Morgan, Lewis & Bockius LLP (57) ABSTRACT

The method is performed as a client device and includes receiving a first message that includes a first data usage value. The first message is formatted according to a respective format. After receiving the first message, the method further includes acquiring a data usage template corresponding to the respective format. The method further includes receiving a second message that includes a second data usage value. The second message is formatted according to the respective format. The method further includes parsing the second message according to the data usage template so as to obtain a second data usage value.

16 Claims, 8 Drawing Sheets

(56) References Cited

U.S. PATENT DOCUMENTS

| | | |
|---|---|---|
| 2011/0225095 A1 | 9/2011 | Gawali et al. |
| 2013/0024720 A1* | 1/2013 | Aggarwal et al. ............ 714/4.11 |
| 2014/0052864 A1* | 2/2014 | Van Der Linden et al. ... 709/226 |

\* cited by examiner

COMPUTER INFORMATION SYSTEM AND DYNAMIC DISASTER RECOVERY METHOD THEREFOR

RELATED APPLICATIONS

This application is a continuation application of PCT Patent Application No. PCT/CN2013/080413, entitled "COMPUTER INFORMATION SYSTEM AND DYNAMIC DISASTER RECOVERY METHOD THEREFOR," filed on Jul. 30, 2013, which claims priority to Chinese Patent Application No. 201210277988.7, entitled "COMPUTER INFORMATION SYSTEM AND DYNAMIC DISASTER RECOVERY METHOD THEREFOR" and filed on Aug. 7, 2012, both of which are incorporated by reference in their entirety.

TECHNICAL FIELD

The present application relates to the technical field of computer information processing, and in particular, to a computer information system and a dynamic disaster recovery method therefor.

BACKGROUND

In a computer information system, to ensure the security and stability of an information service, two or more service processing systems having the same functions need to be established, and functional disaster recovery can be implemented among the two or more service processing systems. That is, when a problem occurs in one service processing system, another service processing system can be used to provide a service to the outside, so that the security and stability of an externally-oriented service can be ensured. Disaster recovery is an important component of system high availability technology, and an impact of the external environment or an emergency on the system needs to be taken into consideration in advance, so that an incapability of the system to provide a service or data loss is avoided when a disaster occurs. The so-called disaster refers to an event that makes it impossible to provide a normal service, such as a machine hardware fault, a network fault, a program crash, and an overload caused by an emergency and so on.

Currently, in the industry a disaster recovery solution is generally implemented in a composition and service architecture of a computer system.

Figure 1:
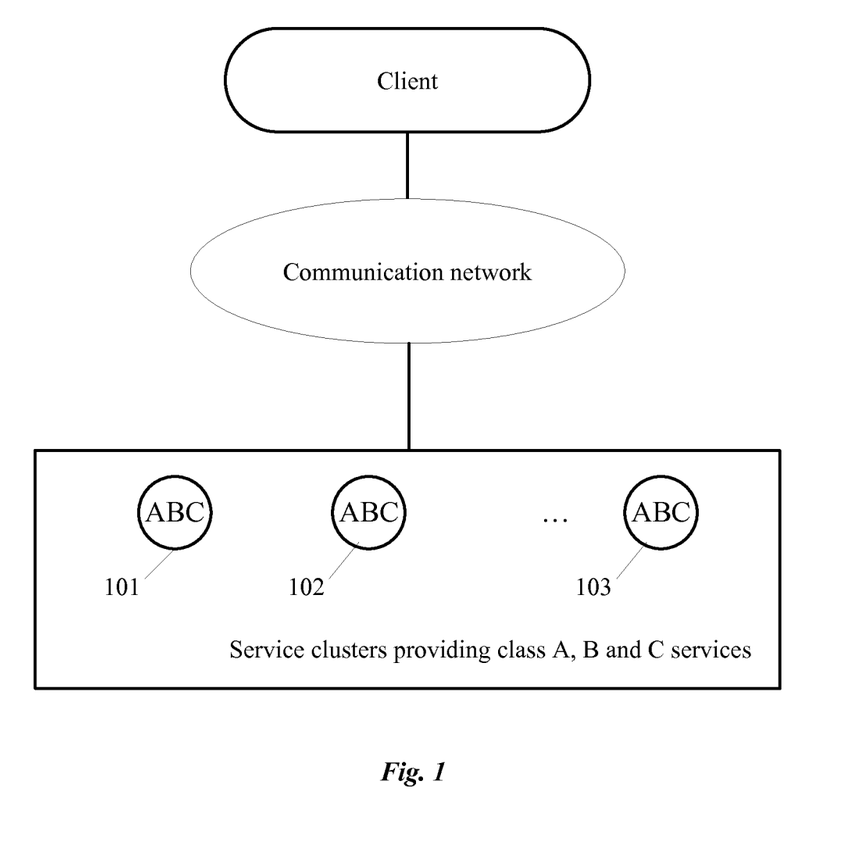
FIG. 1 is a schematic diagram of an architecture of an Internet service system in the prior art.

FIG. 1 is a schematic diagram of an architecture of an Internet service system in the prior art. Referring to FIG. 1, the Internet service system is a specific application field of computer information systems, and in this architecture, all service nodes are peers. For example, there are three peer service nodes 101, 102, and 103 in FIG. 1, each of the service nodes simultaneously providing a processing logic of all services (it is assumed that the service categories are classified class A, B, and C) to the outside, and these peer service nodes form a service cluster. The system architecture in FIG. 1 is currently adopted by many websites, and the disaster recovery principle thereof is that after a client initiates a category of service request, the service request is randomly allocated to a certain service node in the service cluster through a load balancing system on the Transmission Control Protocol (TCP) layer of the system, and the service node responds to the service request. When a disaster event, for example, a hardware fault, occurs in a certain service node, the service request will be allocated to other normally operating service nodes for responding.

Figure 2:
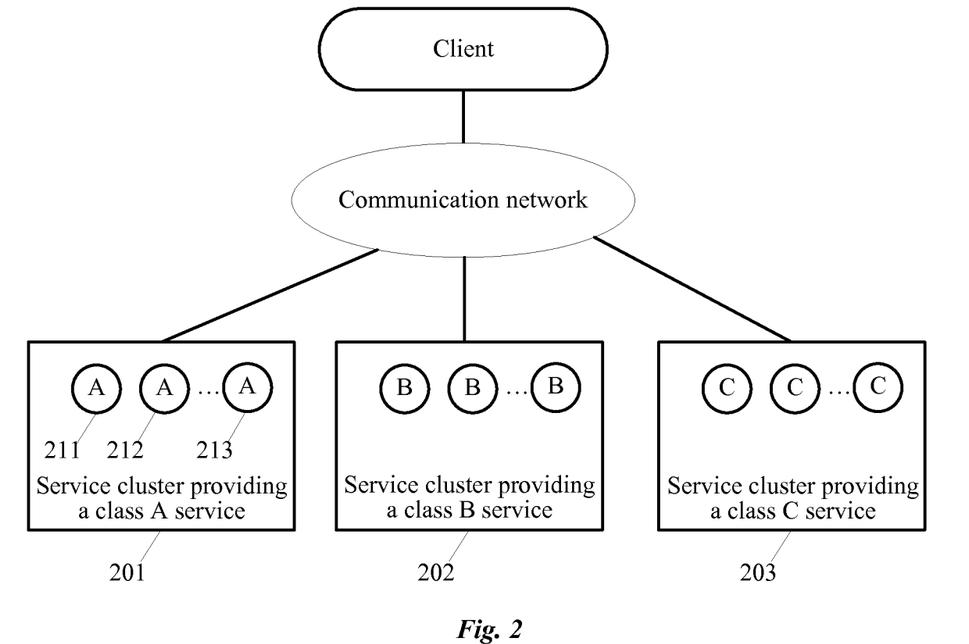
FIG. 2 is a schematic diagram of another architecture of an Internet service system in the prior art.

FIG. 2 is a schematic diagram of another architecture of an Internet service system in the prior art. Referring to FIG. 2, in this architecture, three service clusters are classified according to the service categories thereof, all of the service nodes in each service cluster only provides a respective fixed category of service, and the service nodes within a respective service cluster are peers. For example, in FIG. 2, a service cluster 201 provides a class A service, a service cluster 202 provides a class B service, and a service cluster 203 provides a class C service. Taking the service cluster 201 as an example, each of the service nodes 211, 212, and 213 therein only has a processing logic for the class A service, and the address of the service cluster corresponding to each category of service is set in a client. After the client initiates a service request of the class A service, the class A service request is sent to the service cluster 201, then the service request is randomly allocated to a certain service node in the service cluster 201 through a load balancing system on the TCP layer, and that service node responds to the service request. When a disaster event, for example, a hardware fault, occurs in a service node in the service cluster 201, the class A service request is allocated to other normally operating service nodes within the service cluster 201 for responding. Currently, the system architecture in FIG. 2 is generally adopted by many Internet game service systems.

However, the abovementioned prior arts have the following technical problems: the entire computer information system is poor in robustness. For example, in the architecture illustrated in FIG. 1, if the faulty service nodes in the service cluster reach a certain number, where the actual load of the system is greater than a load that can be borne by the normally operating service nodes, the system is overloaded and is therefore entirely unavailable. In the architecture illustrated in FIG. 2, though services of different categories are separately processed by different service clusters, the problem of poor robustness same as that in the architecture illustrated in FIG. 1 also exists in each of the service clusters. That is, if the faulty service nodes in a service cluster reach a certain number, where the actual load of the service cluster is greater than a load that can be borne by the normally operating service nodes, the service cluster is overloaded and is therefore entirely unavailable, and thus a service of a respective category corresponding to the unavailable service cluster cannot be provided to the outside.

SUMMARY

In view of this, the object of the present invention is to provide a computer information system and a dynamic disaster recovery method therefor, so as to improve the robustness of the computer information system.

The technical solutions of the present invention are implemented as follows.

In accordance with some embodiments, a computer information system includes: at least two service clusters, each service cluster including at least two service nodes, wherein each service node includes service processing logic for processing service requests corresponding to multiple service categories and is configured to process only service requests of a specific service category associated with the service cluster; and a dynamic disaster recovery node configured to set a respective dynamic disaster recovery policy for each service cluster based on the specific service category associated with service cluster, and monitor the operating state of the service cluster; wherein: if the service cluster operates normally, the dynamic disaster recovery node is configured to schedule a service request of the specific service category associated with the service cluster to the service cluster, and if the service cluster operates abnormally, the dynamic disaster recovery node is configured to dynamically adjust the processing of the service request according to the dynamic disaster recovery policy.

In accordance with some embodiments, a dynamic disaster recovery method implemented by a computer information system including a plurality of service nodes comprises: breaking the plurality of service nodes into at least two service clusters and a dynamic disaster recovery node, wherein each service cluster includes at least two service nodes; for each service cluster: installing service processing logic for processing service requests corresponding to multiple service categories into each service node and configuring the service node to process only service requests of a specific service category associated with the service cluster; invoking the dynamic disaster recovery node to set a dynamic disaster recovery policy for the service cluster based on the specific service category associated with service cluster and monitor the operating state of the service cluster; if the service cluster operates normally, scheduling service requests of the specific service category associated with the service cluster to a service node within the service cluster; and if the service cluster operates abnormally, dynamically adjusting the processing of the service requests according to the dynamic disaster recovery policy.

In accordance with some embodiments, a non-transitory computer readable medium is used in connection with a computer information system including a plurality of service nodes. The non-transitory computer readable medium stores one or more programs to be executed by the computer information system, the one or more programs including instructions for: breaking the plurality of service nodes into at least two service clusters and a dynamic disaster recovery node, wherein each service cluster includes at least two service nodes; for each service cluster: installing service processing logic for processing service requests corresponding to multiple service categories into each service node and configuring the service node to process only service requests of a specific service category associated with the service cluster; invoking the dynamic disaster recovery node to set a dynamic disaster recovery policy for the service cluster based on the specific service category associated with service cluster and monitor the operating state of the service cluster; if the service cluster operates normally, scheduling service requests of the specific service category associated with the service cluster to a service node within the service cluster; and if the service cluster operates abnormally, dynamically adjusting the processing of the service requests according to the dynamic disaster recovery policy.

Compared with the prior art, in the present invention, two or more service clusters are classified according to service category, and two or more service nodes are set in each service cluster. The service nodes are all peer nodes. That is, the service nodes all need to be provided with the service processing logics of all the service categories in the system. Meanwhile, the dynamic disaster recovery policy of each service cluster is set. In the case where all of the service clusters are operating normally, a service request of a respective service category is scheduled to a service cluster fixed to correspond to the respective service category for response processing. In the case where one of the service clusters is operating abnormally, a dynamic adjustment is made, according to the dynamic disaster recovery policy of that service cluster, to the responding service cluster and/or the response mode for service requests of the corresponding service category. In this way, all the service nodes in the entire computer information system are peers, and according to the operating state of each of the service clusters, the response mode of a corresponding service cluster to service requests can be adjusted dynamically. Even if the faulty service nodes in one of the service clusters reach a specific number and an externally-oriented service cannot be provided, a service request to which the service cluster correspondingly responds can also be transferred to other normally operating service clusters, so that the service provided by the entire computer information system to the outside is not easily interrupted, thereby improving the robustness of the computer information system.

BRIEF DESCRIPTION OF DRAWINGS

For a better understanding, reference should be made to the following detailed description taken in conjunction with the accompanying drawings, in which.

Like reference numerals refer to corresponding parts throughout the drawings.

DETAILED DESCRIPTION

Reference will now be made in detail to various implementations, examples of which are illustrated in the accompanying drawings. In the following detailed description, numerous specific details are set forth in order to provide a thorough understanding of the present disclosure and the described implementations herein. However, implementations described herein may be practiced without these specific details. In other instances, well-known methods, procedures, components, and mechanical apparatus have not been described in detail so as not to unnecessarily obscure aspects of the implementations.

Figure 3:
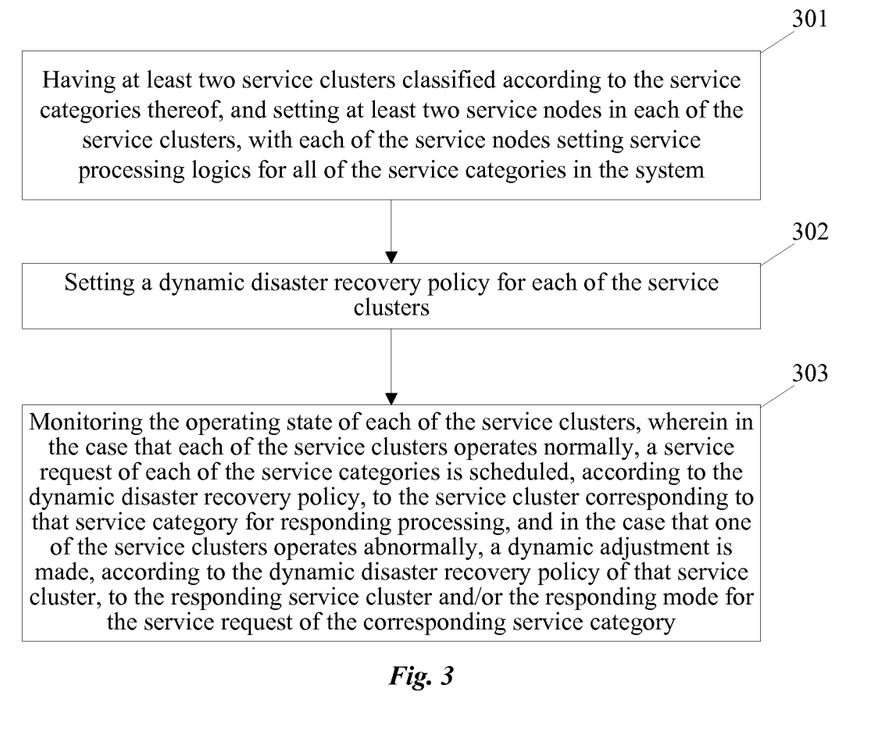
FIG. 3 is a flow chart of a dynamic disaster recovery method for a computer information system in accordance with some embodiments of the present invention.

The present invention is further described in detail below with reference to the accompanying drawings and particular embodiments FIG. 3 is a flow chart of a dynamic disaster recovery method for a computer information system in accordance with some embodiments of the present invention. Referring to FIG. 3, the dynamic disaster recovery method for a computer information system includes the steps of:

Step 301: classifying at least two service clusters according to service category, and setting at least two service nodes in each of the service clusters, with each of the service nodes setting service processing logics for all of the service categories in the system;

Step 302: setting a dynamic disaster recovery policy for each of the service clusters; and Step 303: monitoring the operating state of each of the service clusters, wherein in the case where each of the service clusters are operating normally, a service request of a respective service category is scheduled, according to the dynamic disaster recovery policy, to a service cluster corresponding to that service category for response; and in the case where one of the service clusters is operating abnormally, a dynamic adjustment is made, according to the dynamic disaster recovery policy of that service cluster, to the responding service cluster and/or the response mode of the service request of the corresponding service category.

Corresponding to the method in the present invention, the present invention also discloses a computer information system.

Figure 4:
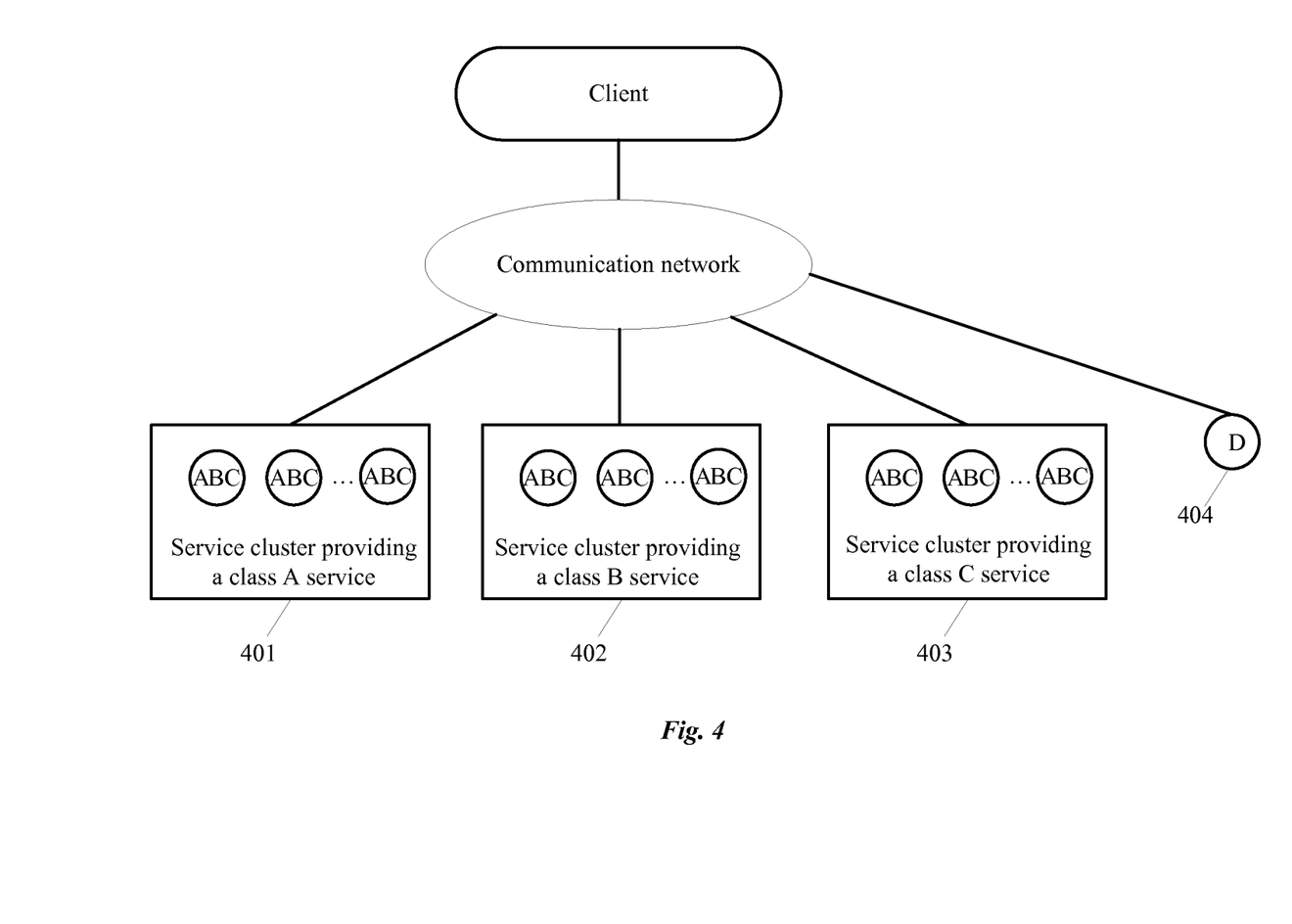
FIG. 4 is a schematic diagram of a system architecture of a computer information system in accordance with some embodiments of the present invention.

FIG. 4 is a schematic diagram of a system architecture of a computer information system in accordance with some embodiments of the present invention. Referring to FIG. 4, the computer information system includes:

at least two service clusters classified according to service category, for example, three service clusters 401, 402, and 403 in FIG. 3, with each service cluster including at least two service nodes, wherein each of the service nodes have service processing logics for all of the service categories in the computer information system, and the service processing logic is used for responding to a service request arriving at the service cluster. That is, all service nodes in all of the service clusters in the present invention are peers in function, and for any category of service request (for example, in FIG. 3, it is assumed that three service categories A, B, and C are classified), any one of the service nodes can perform response processing on a service request.

In addition to the service clusters, the computer information system in accordance with some embodiments of the present invention further includes a dynamic disaster recovery node, that is, a node D 404 in FIG. 4. The dynamic disaster recovery node is used for setting a dynamic disaster recovery policy for each of the service clusters, and monitoring the operating state of each of the service clusters. In the case where all of the service clusters are operating normally, according to the dynamic disaster recovery policy, a service request of a respective service category is scheduled to a service cluster corresponding to that service category for response processing. In the case where one of the service clusters is operating abnormally, a dynamic adjustment is made, according to the dynamic disaster recovery policy of the service cluster, to the responding service cluster and/or the response mode of the service request of the corresponding service category.

Figure 5:
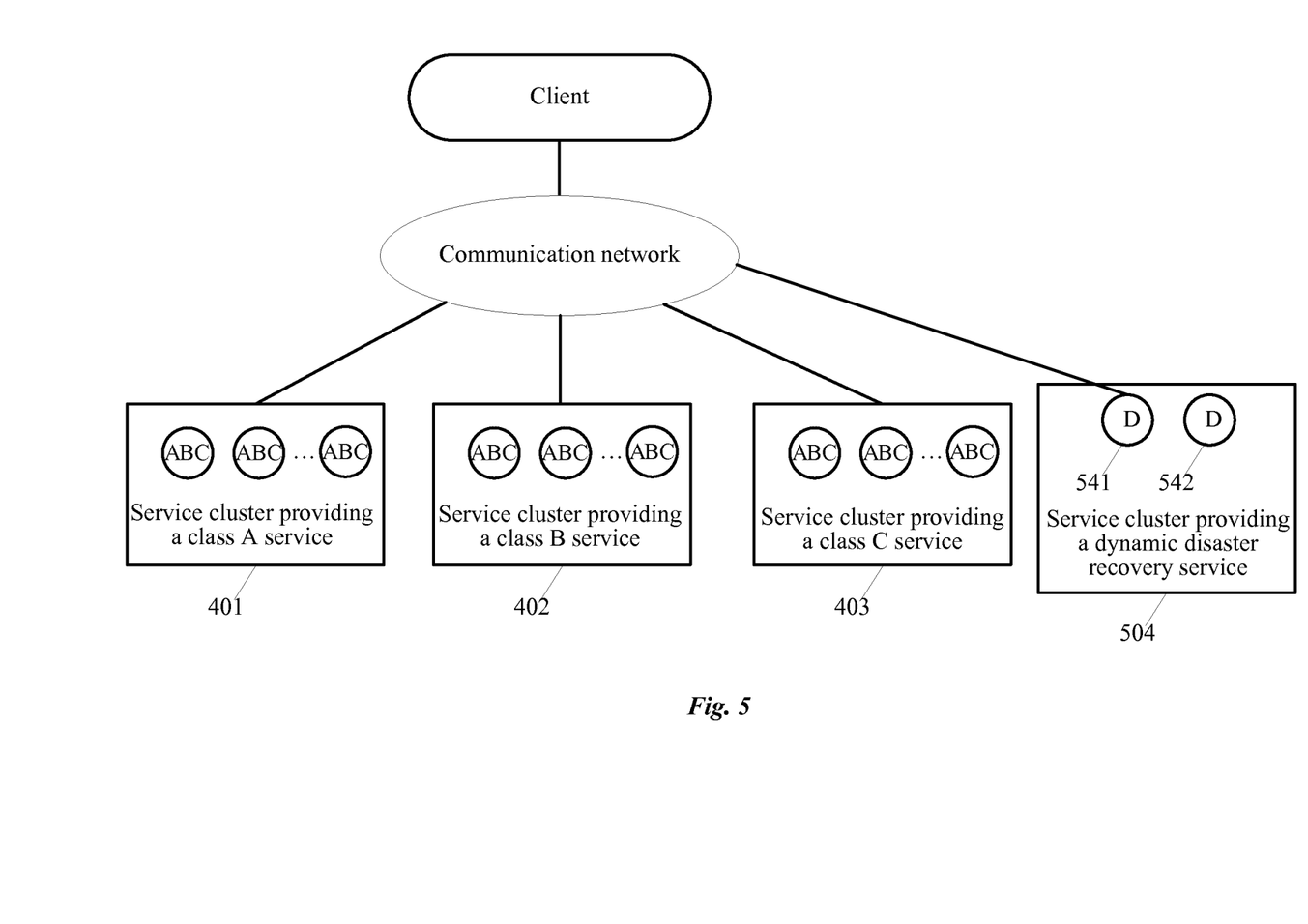
FIG. 5 is a schematic diagram of another system architecture of a computer information system in accordance with some embodiments of the present invention.

In some embodiments, the number of dynamic disaster recovery nodes is one. In some other embodiments, the number of dynamic disaster recovery nodes is two or more than two. For example, FIG. 5 is a schematic diagram of another system architecture of the computer information system in accordance with some embodiments of the present invention, where a primary dynamic disaster recovery node 541 and a standby disaster recovery node 542 that are capable of backing up one another and performing disaster recovery switching on one another are included, and the primary dynamic disaster recovery node 541 and standby disaster recovery node 542 form a disaster recovery service cluster 504 that provides a dynamic disaster recovery service. In a normal situation, the primary dynamic disaster recovery node provides a dynamic disaster recovery service, and when the primary dynamic disaster recovery node operates abnormally, the standby dynamic disaster recovery node can be switched to for further operation. The standby dynamic disaster recovery node is switched to be a primary dynamic disaster recovery node, and the aforementioned primary dynamic disaster recovery node is switched to be a standby dynamic disaster recovery node, thereby further improving the robustness of the entire system.

The dynamic disaster recovery policy may be set in advance, and a particularly set dynamic disaster recovery policy may have various contents, which are in particular introduced in the embodiments below.

In some embodiments, the dynamic disaster recovery policy includes a strategy that: in the case where all of the service clusters are operating normally, a service request of a respective service category is subjected to response processing performed by a service cluster fixed to correspond to that service category. As shown in FIG. 4 and FIG. 5, in the case where all of the service clusters are operating normally, a service cluster 401 only provides a class A service to the outside, a service cluster 402 only provides a class B service to the outside, and a service cluster 403 only provides a class C service to the outside. This fixed correlation is part of the information within the dynamic disaster recovery policy, and needs to be set in advance, and the specific content includes the correlation between each service category and the service cluster address corresponding thereto. In the case where one of the service clusters is operating abnormally, the responding service cluster and/or the response mode of the service request of the corresponding service category need(s) to be adjusted dynamically. Specific adjustment instruction information is also part of the dynamic disaster recovery policy, and generally, a service cluster of each service category has a corresponding dynamic disaster recovery policy including the adjustment instructions.

In step 303, there are many specific methods for monitoring the operating state of each of the service categories. For example, two typical methods are as follows.

A first monitoring method is that: each of the service nodes in each of the service clusters periodically (for example, at an interval of T1 seconds) reports its own load information to the dynamic disaster recovery node, and the load information may include general load information, such as CPU usage, network usage and so on. The dynamic disaster recovery node judges the operating state of each of the service clusters according to the reporting situation and the reported load information. For example, the reporting situation refers to whether a service node reports load information once every T1 second, and if the number or frequency of reports from the service node is less than a specified value, the service node is determined to be abnormal. Then whether the load of the service node exceeds a specified value is judged according to the reported load information. If the load of the service node exceeds the specified value, the service node is determined to be operating abnormally. Finally, whether the number of abnormal service nodes in each service cluster exceeds a specified value is judged. If the number of abnormal service nodes in a respective service cluster exceeds the specified value, it is determined that the respective service cluster is operating abnormally, and otherwise, it is determined that the respective service cluster is operating normally.

Alternatively, a second monitoring method is that: a client requesting a service periodically (for example, at an interval of T2 seconds) reports the number and responding conditions of each category of service requests to the dynamic disaster recovery node, and the dynamic disaster recovery node judges the operating state of a service cluster corresponding to a respective category according to the reported number and responding conditions of service requests of the respective category. For example, if the number of response failures in a certain category of service requests exceeds a specified threshold value, it is determined that a service cluster fixed to correspond to the service category is operating abnormally, and otherwise, it is determined that the service cluster corresponding to the service category is operating normally.

Through the abovementioned monitoring method, the dynamic disaster recovery node can monitor the operating state of each of the service clusters at any time, and make an adjustment according to the operating state and the dynamic disaster recovery policy corresponding to each of the service clusters.

In some embodiments, information about the correlation between each service category and the service cluster address corresponding thereto can be set on various clients. For example, the information may in particular be set on the clients in advance, or be sent to various clients by the dynamic disaster recovery node after the system starts up. After the computer information system initially starts up, all of the service clusters are considered to be operating normally by default, and at this moment, if a client initiates a certain category of service request, the service request of that service category will be sent out, according to the correlation, to a service cluster address corresponding thereto for response processing. For example, a class A service request is sent to a class A service cluster, a class B service request is sent to a class B service cluster, and a class C service request is sent to a class C service cluster. The service cluster receiving the service request randomly allocates the service request to a certain service node in a load balancing manner through the internal TCP layer, and the service node performs responding processing on the service request. When a disaster event, for example, a hardware fault, occurs in a certain service node, the service cluster will allocate the received service request to other normally operating service nodes for response processing.

After the system starts up to operate, the dynamic disaster recovery node monitors the operating state of each of the service clusters by way of the abovementioned monitoring method, and if it is monitored that one of the service clusters is operating abnormally, the dynamic disaster recovery node dynamically adjusts, according to the dynamic disaster recovery policy of the service cluster, the responding service cluster and/or the response mode for service requests of the corresponding service category.

In some embodiments, a technical solution of service categories classified according to a degradable service dimension is also provided. For the abovementioned classifying service clusters according to service categories, the different service categories are distinguished using a degradable service dimension. The degradable service refers to that when a fault occurs in some modules in the service logic, some services can still be provided for a user to meet the core demand of the user, for example, demands such as login of the user to an Internet website and checking personal information and so on, and the service can be referred to as a degradable service. The degradable service dimension assesses a degrading extent acceptable to a degradable service, and the greater the acceptable degrading extent is, the higher a degradable service dimension thereof is.

For example, the abovementioned class A, B, and C services can be classified according to user influence and income influence, and application scenarios of degradable services are taken into consideration. Taking a common Internet service as an example, a class A service is a core user experience service and is indispensable content. The user cannot accept a problem in this category of service, for example, a login operation and so on, the degradable service dimension of which is the lowest. A class B service is a user experience degradable service. Unavailability for a short time in this category of service, for example, services like checking a friend's homepage, uploading or downloading a file and so on, is acceptable to the user, and the degradable service dimension of this category of service is slightly higher than that of the class A service. A class C service is a user experience ignorable service; this category of service only affects user experience, and does not have a great impact even if the service cannot be repaired in a long time, and the degradable service dimension of this category of service is the highest.

As described above, the class A, B, and C services are ranged from low to high according to the degradable service dimensions. When the responding service cluster and/or the response mode of a service request are/is adjusted dynamically, processing can be performed according to different degradable service dimensions.

For example, the specific mode in which the service cluster is operating abnormally and the dynamic disaster recovery node dynamically adjusts the responding service cluster and/or the response mode of the service requests of the corresponding service category according to the dynamic disaster recovery policy of the service cluster includes the following judging and processing step: judging whether the load situation of the other normally operating service cluster(s) can bear the load of the service requests of the category corresponding to the abnormally operating service cluster; if yes, scheduling the normally operating service cluster(s) to respond to the service request of the category corresponding to the abnormally operating service cluster; otherwise, for a service cluster having a degradable service dimension higher than that of the abnormally operating service cluster, stopping response processing performed by the service cluster having the higher degradable service dimension on the service requests of the corresponding category, and repeating the judging and processing step.

For example, as shown in FIG. 4 and FIG. 5, if the dynamic disaster recovery node finds through monitoring that the class A service cluster is operating abnormally, the dynamic disaster recovery node first judges whether the load situation of another normally operating service cluster (for example, the class B service cluster and the class C service cluster herein) can bear the load of class A service requests supposed to be correspondingly responded by the class A service cluster. For example, the judging can in particular be performed according to information reported by the service node or the client, and a specific judging manner may be implemented using techniques known in the art.

If the class B service cluster and the class C service cluster can bear the load of the class A service requests, the normally operating class B service cluster and class C service cluster are scheduled to respond to the class A service requests. For example, it may, in particular, be that the class A service requests from the client is evenly distributed to each of the service nodes in the class B service cluster and the class C service cluster for response processing.

If the class B service cluster and the class C service cluster can bear the load of the class A service requests, since the degradable service dimensions of the class B service cluster and the class C service cluster both are higher than that of the class A service cluster, the responses of the class B service cluster and class C service cluster to the service requests thereof can be adjusted. For example, it may, in particular, be that response processing performed by these service clusters having a high degradable service dimension on service requests of the corresponding category is stopped. If only one service cluster has a degradable service dimension higher than that of the abnormally operating service cluster, response processing performed by the service cluster having the higher degradable service dimension on service requests of the corresponding category is directly stopped. If at least two service clusters have a degradable service dimension higher than that of the abnormally operating service cluster, for example, the situation herein where the degradable service dimensions of the class B service cluster and the class C service cluster are both higher than that of the class A service cluster, response processing performed by the service cluster having the highest degradable service dimension (for example, the class C service cluster herein) on service requests of the corresponding category is first stopped, and then the judging and processing step is repeated. If the load situations of the normally operating service clusters (herein, the class B service cluster and the class C service cluster) still cannot bear the load of the service request of a category corresponding to the abnormally operating service cluster, response processing performed by a service cluster having a one-level lower degradable service dimension (for example, the class B service cluster herein) on service requests of the corresponding category is further stopped. If more than three service clusters have a degradable service dimension higher than that of the abnormal class A service cluster, the judging and processing step is again repeated until the load situation of the normally operating service clusters can bear the load of the class A service request, or until response processing performed by all service clusters having a degradable service dimension higher than that of the class A service cluster on service requests of the corresponding category is stopped.

A service allowing an offline response exists among Internet information services, and the service data thereof is not frequently updated, and therefore can be stored on a server and can also be stored on a client, a service request of this category of service can be subjected to response processing performed by the server, and can also be subjected to offline response processing performed by the client using data stored in the client. For example, some Internet services based on a relationship chain belong to this kind of service allowing an offline response. When a fault occurs in the relationship chain or the relationship chain is under too much pressure, a local relationship chain mode can be started, and when logging in for the first time every day, the client pulls relationship chain data and stores same in the local client without subsequent pulling. In this way, even if a relationship chain service of the server is unavailable, the client can still make an offline response to a relationship chain service request, thereby ensuring that the user can normally use the relationship chain service.

Therefore, in some embodiments, if a service of a category corresponding to a service cluster having a degradable service dimension higher than that of the abnormally operating service cluster is the service allowing an offline response, for example, if the class C service is a service allowing an offline response, the stopping the response processing performed by the class C service cluster on the class C service requests includes adjusting the response mode of the class C service cluster for the class C service requests, which in particular is, for example, changing the class C service requests to an offline response mode, and instructing the initiator client of the service requests to process the service requests locally in the offline response mode.

In some embodiments, a specific operation of the dynamic disaster recovery node dynamically adjusting the responding service cluster and/or the response mode of the service request of the corresponding category includes: the scheduling a normally operating service cluster to respond to a service request of a category corresponding to the abnormally operating service cluster, and/or the stopping response processing performed by one of the service clusters on service requests of the corresponding category, and/or the adjusting the response mode of a certain category of service cluster for service requests of the corresponding category, and specific implementation manners of these methods are as follows:

a) generating scheduling information, including the responding service cluster address and/or response mode information of the service request of the corresponding service category. For example, when it is assumed that an adjustment operation to be performed by the dynamic disaster recovery node is: scheduling the class B service cluster and the class C service cluster to respond to class A service requests, and changing the response mode of class C service requests to the offline response mode, and meanwhile, stopping response processing performed by the class B service cluster on class B service requests, and therefore, in the scheduling information: the address of the responding service cluster corresponding to class A service requests is the addresses of the class B service cluster and the class C service cluster, the address of the responding service cluster corresponding to the class B service requests is empty, and the response mode of the class C service requests is changed to an offline response.

b) Sending the scheduling information to a client. For example, in particular, the scheduling information is actively sent to the client after being generated, or the client queries the dynamic disaster recovery node once every T3 seconds, and the dynamic disaster recovery node sends the latest scheduling information to the client in a manner of a response packet.

c) The client initiates a service request toward a corresponding service cluster according to the received scheduling information, and/or processes the corresponding service request according to the response mode information. For example, according to the scheduling information in step a), the client sends a class A service request to the class B service cluster and the class C service cluster and gives up sending the class B service request, and the class C service request is processed by the client locally in the offline response mode.

As shown in FIG. 4 and FIG. 5, if the dynamic disaster recovery node finds through monitoring that the class B service cluster is operating abnormally, processing can be likewise performed according to the judging and processing step, that is, judging whether the load situations of the other normally operating class A service cluster and class C service cluster can bear the load of class B service requests corresponding to the abnormally operating class B service cluster; if yes, scheduling the normally operating class A service cluster and class C service cluster to respond to the class B service requests; otherwise, for a service cluster with a degradable service dimension higher than that of the class B service cluster, that is, the class C service cluster, stopping response processing performed by the class C service cluster on class C service requests, and then again judging whether loading situations of the class A service cluster and class C service cluster can bear the load of the class B service requests; and if yes, scheduling the normally operating class A service cluster and class C service cluster to respond to the class B service requests; otherwise, performing no more processing.

In addition, a dynamic disaster recovery policy for the class B service requests can also be implemented in another manner, for example, judging whether the time is a service peak period; if yes, the adjustment in the judging and processing step will not be performed, and if the current time is a non-peak period, the judging and processing step is again performed for adjustment.

As shown in FIG. 4 and FIG. 5, if the dynamic disaster recovery node finds through monitoring that the class C service cluster is operating abnormally, processing can be likewise performed according to the judging and processing step, that is, judging whether the load situations of the other normally operating class A service cluster and class B service cluster can bear the load of class C service requests corresponding to the abnormally operating class C service cluster; if yes, scheduling the normally operating class A service cluster and class B service cluster to respond to the class C service requests; otherwise, since the degradable service dimension of the class C service cluster is the highest, the only way is to adjust the response mode of the class C service request, that is, changing the class C service requests to an offline responding mode, and instructing the initiator of a class C service request to process the service requests locally in the offline responding mode.

Of course, the dynamic disaster recovery policy for the class C service request can also be implemented in another manner, for example, if the dynamic disaster recovery node finds through monitoring that the class C service cluster is operating abnormally, the dynamic disaster recovery node can directly adjust the response mode of the class C service requests, that is, the dynamic disaster recovery node changes the class C service requests to the offline responding mode, and instructs the initiator of a class C service request to process the service request locally in the offline responding mode.

In the case that all of the service clusters return to a normal state, the dynamic disaster recovery node continues to schedule a service request of each of the service categories to a service cluster corresponding to that service category for responding processing. For example, in a specific manner, the dynamic disaster recovery node sends to the client scheduling information indicating that the service clusters are operating normally. After receiving the scheduling information, if the client initiates a certain category of service request, according to the stored information about the correlation between each service category and the service cluster address corresponding thereto, the client sends the service request of the service category to a service cluster address corresponding thereto for responding processing. For example, a class A service request is sent to the class A service cluster, a class B service request is sent to the class B service cluster, and a class C service request is sent to the class C service cluster.

As described above, through comparison of the present invention and the prior art, all the service nodes in the entire computer information system are peers, and according to the operating state of each of the service clusters, the responding mode of a corresponding service cluster to a service request can be adjusted dynamically, and even if the faulty service nodes in one of the service clusters reach a specific number and an externally-oriented service cannot be provided, a service request to which the service cluster correspondingly responds can also be transferred to another normally operating service cluster, so that the service provided by the entire computer information system to the outside is not easily interrupted, thereby improving the robustness of the computer information system and improving the capability of dealing with a burst load and a fault.

In addition, in the present invention, since the service nodes are all peers, that is, the service nodes comprise the same processing logic, the present invention has very strong scalability.

In addition, in the present invention, service categories and service clusters corresponding thereto can be classified according to the dimensions of degradable services, when one of the service clusters is abnormal, it is preferably ensured that a service having a low degradable service dimension (that is, a relatively core service) can be continually provided, and a service having a high degradable service dimension (that is, a service for which a user can tolerate a significant drop of service quality) can be stopped or be changed to the offline responding mode; in this way, during disaster recovery, the stability of the core service can be ensured and a satisfaction degree of the user can be improved.

Figure 6:
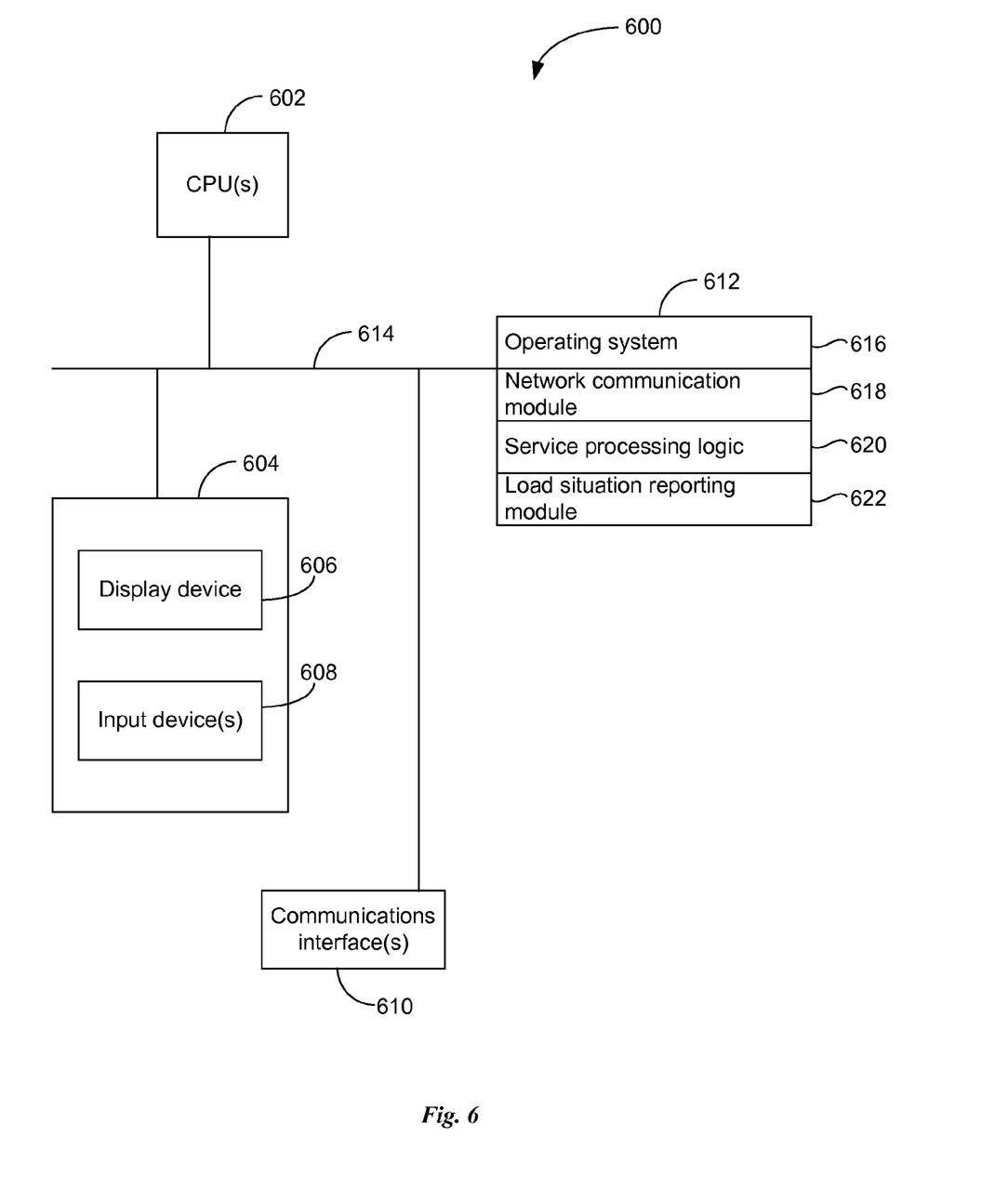
FIG. 6 is a block diagram illustrating a service node in a service cluster in accordance with some embodiments of the present invention.

FIG. 6 is a block diagram illustrating a service node 600 in a service cluster (e.g., service cluster 401, 402, or 403) in accordance with some embodiments. The service node 600 typically includes one or more processing units (CPU's) 602 for executing modules, programs and/or instructions stored in memory 612 and thereby performing processing operations; one or more network or other communications interfaces 610; memory 612; and one or more communication buses 614 for interconnecting these components. The communication buses 614 optionally include circuitry (sometimes called a chipset) that interconnects and controls communications between system components. The service node 600 optionally may include a user interface 604 comprising a display device 606 and a keyboard 608. Memory 612 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 612 may optionally include one or more storage devices remotely located from the CPU(s) 602. Memory 612, or alternately the non-volatile memory device(s) within memory 612, comprises a non-transitory computer readable storage medium. In some embodiments, memory 612, or the computer readable storage medium of memory 612 stores the following programs, modules and data structures, or a subset thereof:

- an operating system 616 that includes procedures for handling various basic system services and for performing hardware dependent tasks;
- a network communication module 618 that is used for connecting the service node 600 to other computers via the one or more communication network interfaces 610 (wired or wireless) and one or more communication networks, such as the Internet, other wide area networks, local area networks, metropolitan area networks, and so on;
- service processing logic 620 for processing service requests corresponding to respective service categories; and
- load situation reporting module 622 for reporting load status or situation to a dynamic disaster recovery node 404.

The service processing logic 620 includes logic for processing requests from the various service categories in the system. Thus, using the examples illustrated in FIGS. 4-5 and described above, service processing logic 620 is capable of responding to class A requests, class B requests, and class C requests.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 612 may store a subset of the modules and data structures identified above. Furthermore, memory 612 may store additional modules and data structures not described above.

Although FIG. 6 shows a "service node," FIG. 6 is intended more as functional description of the various features which may be present in a set of servers than as a structural schematic of the embodiments described herein. In practice, and as recognized by those of ordinary skill in the art, items shown separately could be combined and some items could be separated.

Figure 7:
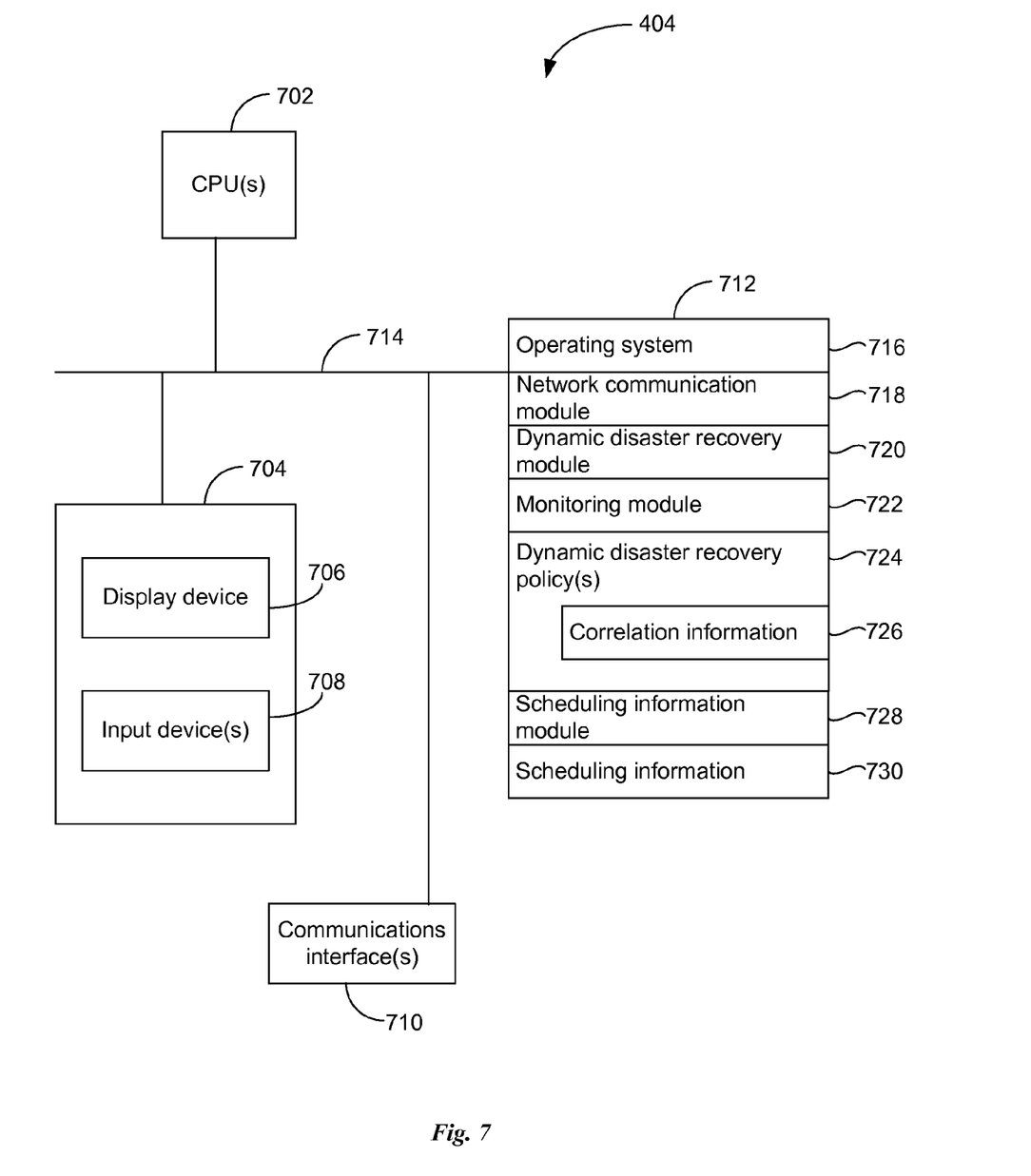
FIG. 7 is a block diagram illustrating a dynamic disaster recovery node in accordance with some embodiments of the present application.

FIG. 7 is a block diagram illustrating a dynamic disaster recovery node 404 (or 541 or 542) in accordance with some embodiments. The dynamic disaster recovery node 404 typically includes one or more processing units (CPU's) 702 for executing modules, programs and/or instructions stored in memory 712 and thereby performing processing operations; one or more network or other communications interfaces 710; memory 712; and one or more communication buses 714 for interconnecting these components. The communication buses 714 optionally include circuitry (sometimes called a chipset) that interconnects and controls communications between system components. The dynamic disaster recovery node 404 optionally may include a user interface 704 comprising a display device 706 and a keyboard 708. Memory 712 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 712 may optionally include one or more storage devices remotely located from the CPU(s) 702. Memory 712, or alternately the non-volatile memory device(s) within memory 712, comprises a non-transitory computer readable storage medium. In some embodiments, memory 712, or the computer readable storage medium of memory 712 stores the following programs, modules and data structures, or a subset thereof:

- an operating system 716 that includes procedures for handling various basic system services and for performing hardware dependent tasks;
- a network communication module 718 that is used for connecting the dynamic disaster recovery node 404 (or 541 or 542) to other computers via the one or more communication network interfaces 710 (wired or wireless) and one or more communication networks, such as the Internet, other wide area networks, local area networks, metropolitan area networks, and so on;
- dynamic disaster recovery module 720 for setting dynamic disaster recovery strategies, and making dynamic adjustments to service clusters when a service cluster is operating abnormally;
- monitoring module 722 for monitoring the operating states of service clusters and service nodes 600; and
- dynamic disaster recover strategy(s) 724 that include adjustment information and other information used for making adjustments during dynamic disaster recovery, including correlation information 726 which includes correspondences between service categories and service clusters; and
- scheduling information module 728 for generating and sending scheduling information 730; and
- scheduling information 730, which includes response mode information for each service cluster.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 712 may store a subset of the modules and data structures identified above. Furthermore, memory 712 may store additional modules and data structures not described above.

Although FIG. 7 shows a "dynamic disaster recovery node," FIG. 7 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 7 could be implemented on single servers and single items could be implemented by one or more servers.

Figure 8:
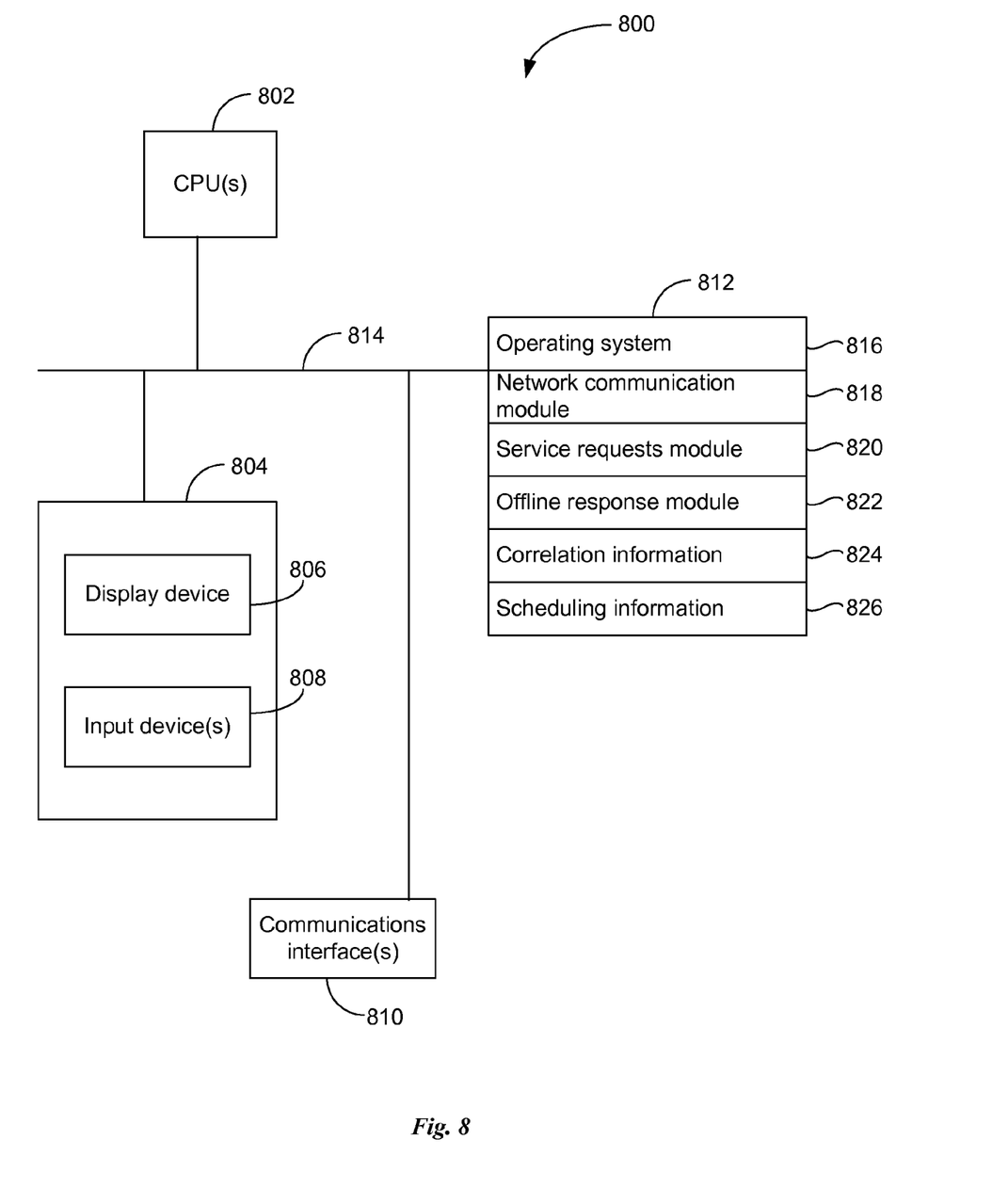
FIG. 8 is a block diagram illustrating a client in accordance with some embodiments of the present application.

FIG. 8 is a block diagram illustrating a client 800 in accordance with some embodiments. The client 404 typically includes one or more processing units (CPU's) 802 for executing modules, programs and/or instructions stored in memory 812 and thereby performing processing operations; one or more network or other communications interfaces 810; memory 812; and one or more communication buses 814 for interconnecting these components. The communication buses 814 optionally include circuitry (sometimes called a chipset) that interconnects and controls communications between system components. The client 404 optionally may include a user interface 804 comprising a display device 806 and a keyboard 808. Memory 812 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 812 may optionally include one or more storage devices remotely located from the CPU(s) 802. Memory 812, or alternately the non-volatile memory device(s) within memory 812, comprises a non-transitory computer readable storage medium. In some embodiments, memory 812, or the computer readable storage medium of memory 812 stores the following programs, modules and data structures, or a subset thereof:

- an operating system 816 that includes procedures for handling various basic system services and for performing hardware dependent tasks;
- a network communication module 818 that is used for connecting the client 800 to other computers via the one or more communication network interfaces 810 (wired or wireless) and one or more communication networks, such as the Internet, other wide area networks, local area networks, metropolitan area networks, and so on;
- service requests module 820 for sending service requests to service clusters;
- offline response module 822 for responding to service requests offline;

correlation information 824 which includes correspondences between service categories and service clusters; and scheduling information 826, which includes response mode information for each service cluster.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 812 may store a subset of the modules and data structures identified above. Furthermore, memory 812 may store additional modules and data structures not described above.

Although FIG. 8 shows a "client," FIG. 8 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 8 could be implemented on single servers and single items could be implemented by one or more servers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What are described above are merely preferred embodiments of the present invention and are not used to limit the present invention, and any modifications, equivalent substitutions, improvements and so on made within the spirit and principles of the present invention shall all be contained in the protection scope of the present invention.

Although the terms first, second, etc. may be used herein to describe various elements, these elements should not be limited by these terms. These terms are only used to distinguish one element from another. For example, first ranking criteria could be termed second ranking criteria, and, similarly, second ranking criteria could be termed first ranking criteria, without departing from the scope of the present invention. First ranking criteria and second ranking criteria are both ranking criteria, but they are not the same ranking criteria.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain principles of the invention and its practical applications, to thereby enable others skilled in the art to best utilize the invention and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. A computer information system, comprising:
a core user experience service cluster, a user experience degradable service cluster, and a user experience ignorable service cluster, each service cluster including at least two service nodes, wherein each service node includes service processing logic for processing service requests corresponding to multiple service categories and is configured to process only service requests of a specific service category associated with the service cluster; and
a dynamic disaster recovery node configured to set a respective dynamic disaster recovery policy for each service cluster based on the specific service category associated with service cluster, and monitor the operating state of the service cluster; wherein:
if the service cluster operates normally, the dynamic disaster recovery node is configured to schedule a service request of the specific service category associated with the service cluster to the service cluster, and if the service cluster operates abnormally, the dynamic disaster recovery node is configured to dynamically adjust the processing of the service request according to the dynamic disaster recovery policy;

if the core user experience service cluster operates abnormally, evenly distributing at least a subset of the service requests among the service nodes of the user experience degradable service cluster and the user experience ignorable service cluster;

if the user experience degradable service cluster operates abnormally, evenly distributing at least a subset of the service requests among the service nodes of the user experience ignorable service cluster; and if the user experience ignorable service cluster operates abnormally, updating the dynamic disaster recovery policy of the user experience ignorable service cluster so as to drop at least a subset of the service requests.

2. The computer information system of claim 1, further including a primary dynamic disaster recovery node and a standby disaster recovery node, wherein the primary and standby dynamic disaster recover nodes are configured to back up each other and perform disaster recovery switching between each other.

3. The computer information system of claim 1, wherein the dynamic disaster recovery node is further configured to check load balances at three service clusters in the computer information system before performing the dynamic adjustment.

4. The computer information system of claim 1, wherein, if the core user experience service cluster operates abnormally, the dynamic disaster recovery node is further configured to:
determine whether the user experience degradable service cluster and the user experience ignorable service cluster are capable of handing the service requests;
if not, update the dynamic disaster recovery policy of the user experience ignorable service cluster until the user experience ignorable service cluster has enough capacity for handling the service requests; and
if still not, update the dynamic disaster recovery policy of the user experience degradable service cluster until the user experience degradable service cluster has enough capacity for handling the service requests.

5. The computer information system of claim 1, wherein, if the user experience degradable service cluster operates abnormally, the dynamic disaster recovery node is further configured to:
determine whether the user experience ignorable service cluster has enough capacity for handling the service requests;
if not, determine whether the computer information system is within a peak operating period;
if the computer information system is not within the peak operating period, evenly distribute the service requests among the service nodes of the user experience ignorable service cluster and the core user experience service cluster; and
if the computer information system is within the peak operating period, drop at least a subset of service requests directed to the user experience ignorable service cluster until it has enough capacity for handling the service requests directed to the user experience degradable service cluster.

6. The computer information system of claim 1, wherein each of the three service clusters is configured to report its load balance to the dynamic disaster recovery node at a first predefined time interval and the dynamic disaster recovery node is configured to report the updated dynamic disaster recovery policy of each of the three clusters to a corresponding client at a second predefined time interval.

7. A dynamic disaster recovery method implemented by a computer information system including a plurality of service nodes, the method comprising:
breaking the plurality of service nodes into a core user experience service cluster, a user experience degradable service cluster, a user experience ignorable service cluster, and a dynamic disaster recovery node, wherein each service cluster includes at least two service nodes;
for each service cluster:
installing service processing logic for processing service requests corresponding to multiple service categories into each service node and configuring the service node to process only service requests of a specific service category associated with the service cluster;
invoking the dynamic disaster recovery node to set a dynamic disaster recovery policy for the service cluster based on the specific service category associated with service cluster and monitor the operating state of the service cluster;
if the service cluster operates normally, scheduling service requests of the specific service category associated with the service cluster to a service node within the service cluster; and
if the service cluster operates abnormally, dynamically adjusting the processing of the service requests according to the dynamic disaster recovery policy;
if the core user experience service cluster operates abnormally, invoking the dynamic disaster recovery node to evenly distribute at least a subset of the service requests among the service nodes of the user experience degradable service cluster and the user experience ignorable service cluster;
if the user experience degradable service cluster operates abnormally, invoking the dynamic disaster recovery node to evenly distribute at least a subset of the service requests among the service nodes of the user experience ignorable service cluster; and
if the user experience ignorable service cluster operates abnormally, invoking the dynamic disaster recovery node to update the dynamic disaster recovery policy of the user experience ignorable service cluster so as to drop at least a subset of the service requests.

8. The method of claim 7, wherein the dynamic disaster recovery node is configured to check load balances at three service clusters in the computer information system before performing the dynamic adjustment.

9. The method of claim 7, wherein the step of invoking the dynamic disaster recovery node to evenly distribute at least a subset of the service requests among the service nodes of the user experience degradable service cluster and the user experience ignorable service cluster further includes:
determining whether the user experience degradable service cluster and the user experience ignorable service cluster are capable of handing the service requests;
if not, updating the dynamic disaster recovery policy of the user experience ignorable service cluster until the user experience ignorable service cluster has enough capacity for handling the service requests; and
if still not, updating the dynamic disaster recovery policy of the user experience degradable service cluster until the user experience degradable service cluster has enough capacity for handling the service requests.

10. The method of claim 7, wherein the step of invoking the dynamic disaster recovery node to evenly distribute at least a subset of the service requests among the service nodes of the user experience ignorable service cluster further includes:

determining whether the user experience ignorable service cluster has enough capacity for handling the service requests;

if not, determining whether the computer information system is within a peak operating period;

if the computer information system is not within the peak operating period, invoking the dynamic disaster recovery node to evenly distribute the service requests among the service nodes of the user experience ignorable service cluster and the core user experience service cluster; and if the computer information system is within the peak operating period, invoking the dynamic disaster recovery node to drop at least a subset of service requests directed to the user experience ignorable service cluster until it has enough capacity for handling the service requests directed to the user experience degradable service cluster.

11. The method of claim 7, wherein each of the three service clusters is configured to report its load balance to the dynamic disaster recovery node at a first predefined time interval and the dynamic disaster recovery node is configured to report the updated dynamic disaster recovery policy of each of the three clusters to a corresponding client at a second predefined time interval.

12. A non-transitory computer readable medium used in connection with a computer information system including a plurality of service nodes, wherein the non-transitory computer readable medium stores one or more programs to be executed by the computer information system, the one or more programs including instructions for:

breaking the plurality of service nodes into a core user experience service cluster, a user experience degradable service cluster, a user experience ignorable service cluster, and a dynamic disaster recovery node, wherein each service cluster includes at least two service nodes;

for each service cluster:
installing service processing logic for processing service requests corresponding to multiple service categories into each service node and configuring the service node to process only service requests of a specific service category associated with the service cluster;

invoking the dynamic disaster recovery node to set a dynamic disaster recovery policy for the service cluster based on the specific service category associated with service cluster and monitor the operating state of the service cluster;

if the service cluster operates normally, scheduling service requests of the specific service category associated with the service cluster to a service node within the service cluster; and if the service cluster operates abnormally, dynamically adjusting the processing of the service requests according to the dynamic disaster recovery policy;

if the core user experience service cluster operates abnormally, invoking the dynamic disaster recovery node to evenly distribute at least a subset of the service requests among the service nodes of the user experience degradable service cluster and the user experience ignorable service cluster;

if the user experience degradable service cluster operates abnormally, invoking the dynamic disaster recovery node to evenly distribute at least a subset of the service requests among the service nodes of the user experience ignorable service cluster; and if the user experience ignorable service cluster operates abnormally, invoking the dynamic disaster recovery node to update the dynamic disaster recovery policy of the user experience ignorable service cluster so as to drop at least a subset of the service requests.

13. The non-transitory computer readable medium of claim 12, wherein the dynamic disaster recovery node is configured to check load balances at three service clusters in the computer information system before performing the dynamic adjustment.

14. The non-transitory computer readable medium of claim 12, wherein the instructions for invoking the dynamic disaster recovery node to evenly distribute at least a subset of the service requests among the service nodes of the user experience degradable service cluster and the user experience ignorable service cluster further include instructions for:

determining whether the user experience degradable service cluster and the user experience ignorable service cluster are capable of handing the service requests;

if not, updating the dynamic disaster recovery policy of the user experience ignorable service cluster until the user experience ignorable service cluster has enough capacity for handling the service requests; and if still not, updating the dynamic disaster recovery policy of the user experience degradable service cluster until the user experience degradable service cluster has enough capacity for handling the service requests.

15. The non-transitory computer readable medium of claim 12, wherein the instructions for invoking the dynamic disaster recovery node to evenly distribute at least a subset of the service requests among the service nodes of the user experience ignorable service cluster further include instructions for:

determining whether the user experience ignorable service cluster has enough capacity for handling the service requests;

if not, determining whether the computer information system is within a peak operating period;

if the computer information system is not within the peak operating period, invoking the dynamic disaster recovery node to evenly distribute the service requests among the service nodes of the user experience ignorable service cluster and the core user experience service cluster; and if the computer information system is within the peak operating period, invoking the dynamic disaster recovery node to drop at least a subset of service requests directed to the user experience ignorable service cluster until it has enough capacity for handling the service requests directed to the user experience degradable service cluster.

16. The non-transitory computer readable medium of claim 12, wherein each of the three service clusters is configured to report its load balance to the dynamic disaster recovery node at a first predefined time interval and the dynamic disaster recovery node is configured to report the updated dynamic disaster recovery policy of each of the three clusters to a corresponding client at a second predefined time interval.

* * * * *